(12) United States Patent
Ishida et al.

(10) Patent No.: US 12,468,101 B2
(45) Date of Patent: Nov. 11, 2025

(54) OPTICAL DEVICE

(71) Applicant: SUMITOMO ELECTRIC INDUSTRIES, LTD., Osaka (JP)

(72) Inventors: Takuya Ishida, Osaka (JP); Tetsuya Nakanishi, Osaka (JP); Hong Chuyen Nguyen, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/007,958

(22) PCT Filed: May 23, 2022

(86) PCT No.: PCT/JP2022/021141
§ 371 (c)(1),
(2) Date: Dec. 2, 2022

(87) PCT Pub. No.: WO2023/286455
PCT Pub. Date: Jan. 19, 2023

(65) Prior Publication Data
US 2024/0231020 A1    Jul. 11, 2024

(30) Foreign Application Priority Data
Jul. 16, 2021 (JP) ................................. 2021-118009

(51) Int. Cl.
*G02B 6/42* (2006.01)
(52) U.S. Cl.
CPC ......... *G02B 6/4261* (2013.01); *G02B 6/4278* (2013.01)

(58) Field of Classification Search
CPC ....... G02B 6/42; G02B 6/4261; G02B 6/4278
See application file for complete search history.

(56) References Cited

U.S. PATENT DOCUMENTS

| | | | |
|---|---|---|---|
| 5,104,243 A | 4/1992 | Harding | |
| 5,546,281 A | 8/1996 | Poplawski et al. | |
| 10,079,451 B2* | 9/2018 | Henry | H01R 13/6335 |
| 2003/0053767 A1* | 3/2003 | Cheng | G02B 6/4292 385/52 |
| 2003/0171016 A1* | 9/2003 | Bright | G02B 6/4277 439/160 |
| 2011/0081807 A1* | 4/2011 | Rephaeli | G02B 6/4246 439/620.21 |
| 2012/0251056 A1 | 10/2012 | Tanaka et al. | |

(Continued)

FOREIGN PATENT DOCUMENTS

| | | |
|---|---|---|
| JP | H4-230978 A | 8/1992 |
| JP | H8-265180 A | 10/1996 |

(Continued)

*Primary Examiner* — Tina Wong
(74) *Attorney, Agent, or Firm* — Oliff PLC

(57) ABSTRACT

An optical device includes: a host device having a first housing, a first optical connector arranged inside the first housing, and an electrical connector arranged inside the first housing; and a light-emitting device having a second optical connector optically connected to the first optical connector, an electrical plug electrically connected to the electrical connector, and a second housing accommodating the second optical connector and the electrical plug and inserted into the first housing. The second housing has a latch structure latched onto the first housing when inserted into the first housing.

5 Claims, 8 Drawing Sheets

(56) References Cited

U.S. PATENT DOCUMENTS

| | | | | |
|---|---|---|---|---|
| 2013/0251314 A1* | 9/2013 | Ito | ........................ | H05K 9/0058 |
| | | | | 385/88 |
| 2014/0254993 A1 | 9/2014 | Koutrokois | | |
| 2016/0154185 A1 | 6/2016 | Mori et al. | | |
| 2016/0216459 A1 | 7/2016 | Matsubara et al. | | |
| 2020/0150364 A1* | 5/2020 | Leigh | ................... | G02B 6/4261 |
| 2020/0158969 A1* | 5/2020 | Leigh | ................... | G02B 6/4261 |

FOREIGN PATENT DOCUMENTS

| | | |
|---|---|---|
| JP | 2012-220541 A | 11/2012 |
| JP | 2015-153609 A | 8/2015 |
| WO | 02/01269 A1 | 1/2002 |
| WO | 2015/046488 A1 | 4/2015 |

\* cited by examiner

OPTICAL DEVICE

TECHNICAL FIELD

The present disclosure relates to optical devices.

This application is based upon and claims the benefit of priority from Japanese Patent Application No. 2021-118009, filed on Jul. 16, 2021, the entire contents of which are incorporated herein by reference.

BACKGROUND ART

Patent Literature 1 describes an opto-electric module. The opto-electric module has an optical connector into which a plurality of daughter boards mounted on a mother board are inserted and a mating connector optically connected to the optical connector. Each of the optical connector and the mating connector has a plurality of ferrules.

The ferrule of the optical connector optically connects to the ferrule of the mating connector. The optical connector has a latch mechanism that is engaged with the mating connector.

CITATION LIST

Patent Literature

Patent Literature 1: International Publication WO 02/01269

SUMMARY OF INVENTION

An optical device according to the present disclosure includes a host device having a first housing, a first optical connector arranged inside the first housing, and an electrical connector arranged inside the first housing, and a light-emitting device having a second optical connector optically connected to the first optical connector and an electrical plug electrically connected to the electrical connector, and a second housing accommodating the second optical connector and the electrical plug and inserted into the first housing. The second housing has a latch structure latched onto the first housing when inserted into the first housing.

DESCRIPTION OF EMBODIMENTS

Figure 1:
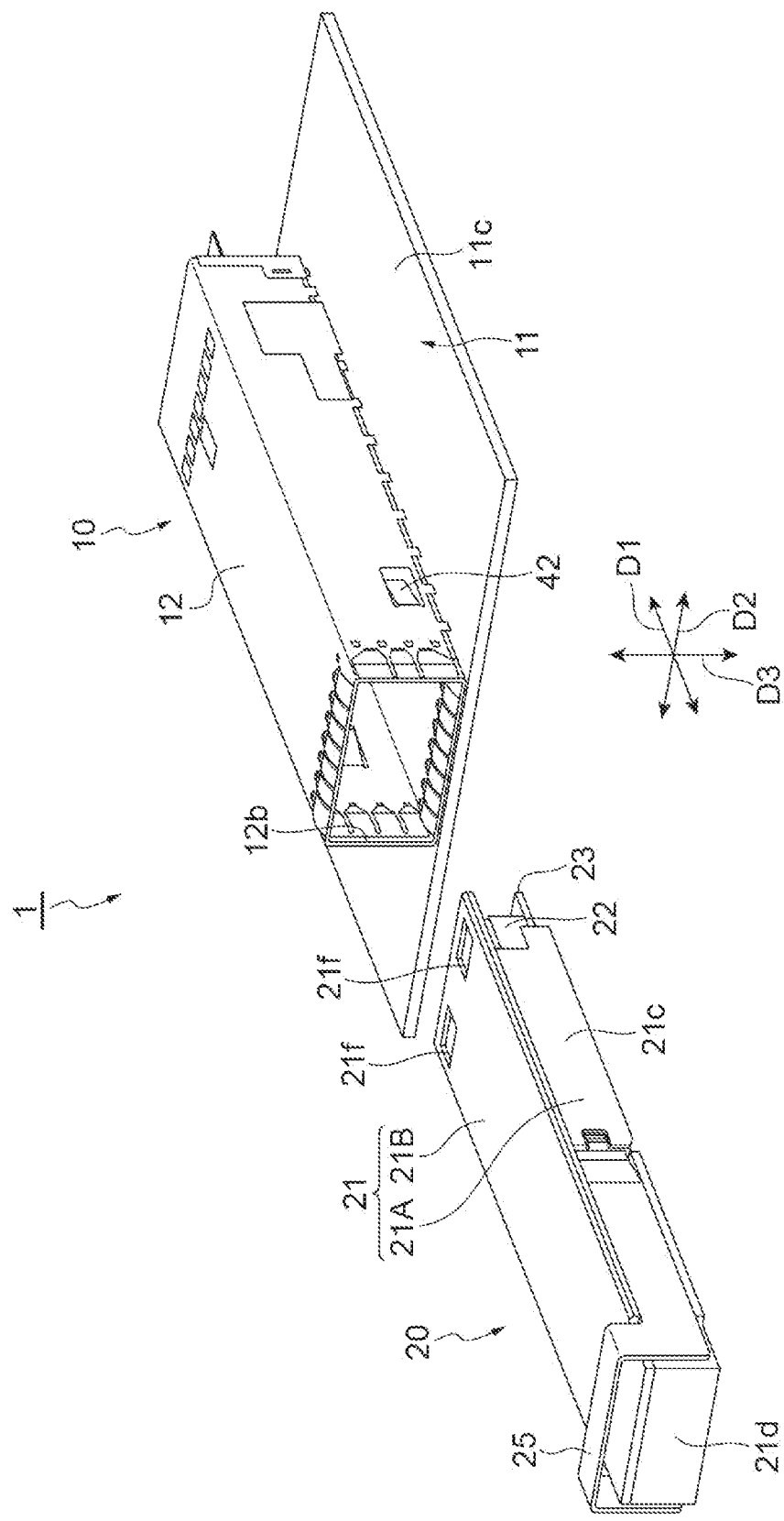
FIG. 1 is a perspective view illustrating an optical device according to an embodiment.

When the optical connector of the optical device has the latch mechanism, there is a concern that the optical connector will be enlarged by the latch mechanism. Since there is a concern that the optical connector will be enlarged in this manner, there is room for improvement in terms of space saving of the optical device.

An object of the present disclosure is to provide an optical device capable of achieving space saving.

Description of Embodiments of the Present Disclosure

First, the embodiments of the optical device according to the present disclosure will be listed. An optical device according to one embodiment includes: (1) a host device having a first housing, a first optical connector arranged inside the first housing, and an electrical connector arranged inside the first housing; and a light-emitting device having a second optical connector optically connected to the first optical connector, an electrical plug electrically connected to the electrical connector, and a second housing accommodating the second optical connector and the electrical plug and inserted into the first housing. The second housing has a latch structure latched onto the first housing when inserted into the first housing.

This optical device includes a host device and a light-emitting device. The host device has a first optical connector, an electrical connector, and a first housing accommodating the first optical connector and the electrical connector. The light-emitting device includes a second optical connector, an electrical plug, and a second housing accommodating the second optical connector and the electrical plug. The second housing has a latch structure latched onto the first housing. Therefore, the first optical connector and the second optical connector can be configured not to have the latch structure. Therefore, an increase in the size of the optical connector can be suppressed, and thus, space saving can be achieved.

(2) In (1) described above, the second optical connector may have a guide hole, and the first optical connector may have a guide pin inserted into the guide hole. In this case, by inserting the guide pin into the guide hole, a position accuracy of the first optical connector and the second optical connector at the time of connection can be improved. In the embodiment, the guide hole is a guide hole provided in a place other than the MT ferrule (first ferrule and second ferrule). In the embodiments, the guide pin is a guide pin provided in the place other than the MT ferrule.

(3) In (2) described above, the first optical connector may have a first optical fiber and a first ferrule holding the first optical fiber. The second optical connector may have a second optical fiber and a second ferrule holding the second optical fiber. An area of a cross section of an opening of the guide hole perpendicular to a direction in which an optical axis of the second optical fiber extends may be 0.5% or more and 15% or less of an area of a cross section of the light-emitting device perpendicular to the direction in which the optical axis of the second optical fiber extends and may be 5% or more and 60% or less of an area of an end face of the second ferrule where the second optical fiber is exposed. In this case, the strength of the guide pin inserted into the guide hole can be maintained, and an increase in the size of the light-emitting device can be suppressed.

(4) In (1) described above, the first optical connector may have a guide hole. The second optical connector may have a guide pin inserted into the guide hole.

(5) In (1) described above, the second optical connector may have an uneven portion formed on a surface of the second optical connector and into which the first optical connector is inserted. In the embodiment, the surface of the second optical connector is a surface (for example, a side face 59c (refer to FIG. 8)) other than an abutment surface of the second optical connector with respect to the first optical connector.

(6) In any one of (1) to (5) described above, the latch mechanism may further have a mechanism where a latch is released when pulled out.

Details of the Embodiment of the Present Disclosure

A specific example of the optical device according to the embodiment will be described below with reference to the drawings. The present invention is not limited to the following examples, but is intended to include all modified examples indicated in the scope of claims and within the scope of equivalents to the scope of claims. In the description of the drawings, the same or corresponding elements are denoted by the same reference numerals, and redundant descriptions thereof are omitted as appropriate. The drawings may be partially simplified or exaggerated for easy understanding, and the dimensional ratios and the like are not limited to those described in the drawings.

FIG. 1 is a perspective view illustrating an optical device 1 according to an embodiment. As illustrated in FIG. 1, the optical device 1 includes a host device 10 and a light-emitting device 20. The optical device 1 is, for example, an opto-electric integrated device that handles both optical and electrical signals. The host device 10 includes a host substrate 11 extending in both a first direction D1 and a second direction D2 and a first housing 12 mounted on the host substrate 11. The light-emitting device 20 includes a second housing 21 extending in the first direction D1, a second optical connector 22 accommodated in the second housing 21, and an electrical plug 23 accommodated in the second housing 21. The first housing 12 has an opening 12b directed in the first direction D1. The first direction D1 corresponds to a longitudinal direction of the first housing 12 and the second housing 21, and the second direction D2 corresponds to a width direction of the first housing 12 and the second housing 21. For example, the first direction D1, the second direction D2 and a third direction D3 are perpendicular to each other.

Figure 2:
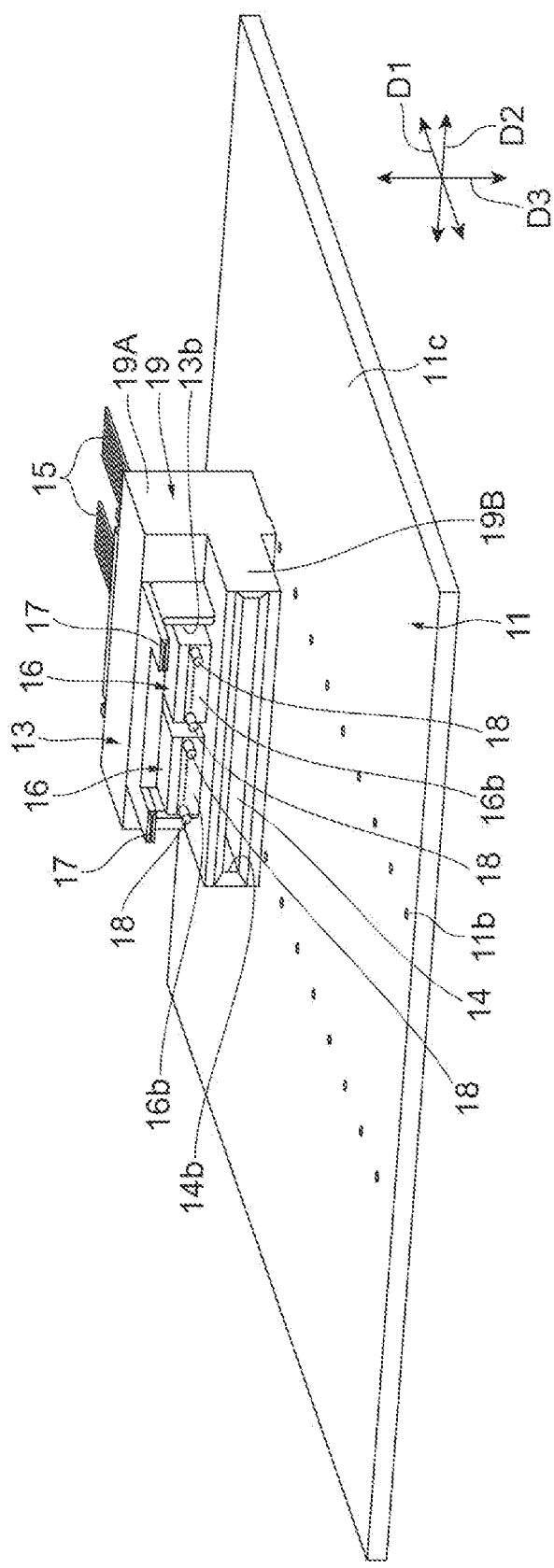
FIG. 2 is a perspective view illustrating a first optical connector, an electrical connector, and a host substrate of a host device of the optical device according to the embodiment.

The host device 10 supplies electrical signals to the light-emitting device 20 and receives optical signals from the light-emitting device 20. The host substrate 11 is a substrate on which electrical components are mounted. The host substrate 11 has a main surface 11c on which electrical components are mounted. FIG. 2 is a perspective view illustrating a state where the first housing 12 is removed from the host device 10. As illustrated in FIGS. 1 and 2, for example, the host substrate 11 is formed with a plurality of holes 11b in which electronic substrates are mounted. The host device 10 has a first optical connector 13 and an electrical connector 14. The first optical connector 13 and the electrical connector 14 are integrated as, for example, a block 19.

The block 19 has a first portion 19A containing the first optical connector 13 and a second portion 19B containing the electrical connector 14. The first portion 19A and the second portion 19B have, for example, a rectangular parallelepiped shape. The area of the second portion 19B is larger than the area of the first portion 19A as viewed from a third direction D3 intersecting (as an example, perpendicular to) both the first direction D1 and the second direction D2. The third direction D3 corresponds to an out-of-plane direction of the main surface 11c. The electrical connector 14 has an opening 14b facing the first direction D1 in the block 19 (second portion 19B). The electrical plug 23 is inserted into the opening 14b. The light-emitting device 20 is electrically connected to the host device 10 by inserting the electrical plug 23 into the opening 14b.

The second optical connector 22 of the light-emitting device 20 is optically connected to the first optical connector 13. The first optical connector 13 is provided, for example, at a position further separated from the main surface 11c than the electrical connector 14 is. The first optical connector 13, the electrical connector 14, and the host substrate 11 are aligned in this order along the third direction D3.

The first optical connector 13 includes a first optical fiber 15, a first ferrule 16, a guide pin 17, and a ferrule guide pin 18. The first optical connector 13 includes the two first ferrules 16 aligned along the second direction D2. The first ferrule 16 is, for example, an MT ferrule. The first optical connector 13 has a plurality of the first optical fibers 15. The first ferrule 16 holds the plurality of first optical fibers 15 aligned along the second direction D2. As an example, the number of first optical fibers 15 held by the first ferrule 16 is 16. The first optical connector 13 has a total of 32 first optical fibers 15.

The first optical connector 13 has a through-hole 13b penetrating along the first direction D1. The first optical fiber 15 and the first ferrule 16 are arranged in the through-hole 13b. The first ferrule 16 protrudes from the through-hole 13b. A plurality of the first optical fibers 15 extend from the opposite side of the through-hole 13b to the first ferrule 16. The first ferrule 16 has an end face 16b that is optically connected to the light-emitting device 20. Distal end faces of the plurality of first optical fibers 15 are exposed on the end face 16b. An optical signal is input from the light-emitting device 20 to each of the plurality of first optical fibers 15 exposed on the end face 16b. For example, the end face 16b and the distal end face of the first optical fiber 15 are polished so as to be flush with each other.

The guide pin 17 protrudes, for example, in the same direction (first direction D1) as the direction in which the first ferrule 16 protrudes from the through-hole 13b. The guide pins 17 are provided for positioning the first optical connector 13 with respect to the second optical connector 22. The first optical connector 13 has, for example, the two guide pins 17 aligned along the second direction D2. The guide pin 17 has, for example, a plate shape extending in both the first direction D1 and the second direction D2.

The guide pin 17 is provided on the side opposite to the electrical connector 14 as viewed from the first ferrule 16. The pair of guide pins 17 are provided on both end sides of the pair of first ferrules 16 in the second direction D2 when viewed along the third direction D3. The first optical connector 13 includes a pair of the ferrule guide pins 18 aligned along the second direction D2 on the end face 16b of the first ferrule 16. The ferrule guide pin 18 is provided for positioning the first ferrules 16 and the second ferrules 27 of the second optical connector 22 described later.

Figure 3:
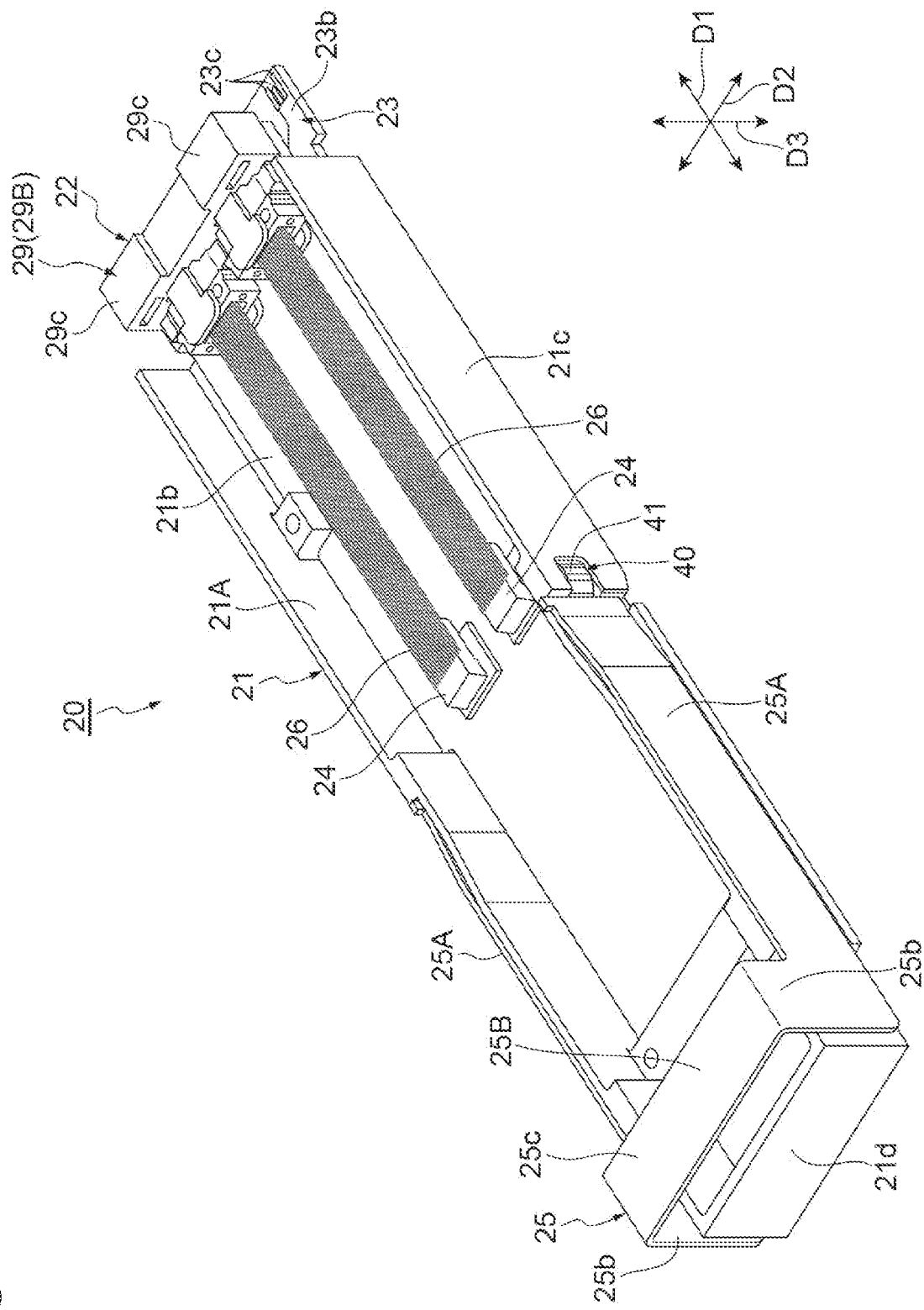
FIG. 3 is a perspective view illustrating an internal structure of a light-emitting device of the optical device according to the embodiment.

FIG. 3 is a perspective view illustrating the internal structure of the light-emitting device 20. As illustrated in FIG. 3, the light-emitting device 20 has the above-described second housing 21, the above-described second optical connector 22, the above-described electrical plug 23, a light-emitting element 24, and a lever 25. As illustrated in FIGS. 1 and 3, the second housing 21 includes a lower housing 21A accommodating the light-emitting element 24, and an upper housing 21B that is a lid sealing the lower housing 21A. In the following description, the direction in which the upper housing 21B is provided with respect to the lower housing 21A may be referred to as upward or an upper side, and the direction in which the lower housing 21A is provided with respect to the upper housing 21B may be referred to as downward or a lower side.

The lower housing 21A has a bottom face 21b, a pair of side faces 21c, and an end face 21d. The bottom face 21b extends in both the first direction D1 and the second direction D2. The pair of side faces 21c extend in both the first direction D1 and the third direction D3 and are aligned along the second direction D2. The end face 21d extends in both the second direction D2 and the third direction D3 at one end in the first direction D1. The upper housing 21B has a flat shape extending in both the first direction D1 and the second direction D2. The upper housing 21B has an opening 21f through which a portion of the second optical connector 22 is exposed. For example, a pair of the openings 21f are aligned along the second direction D2. As an example, the opening 21f has a rectangular shape.

The area of the second housing 21 as viewed along the first direction D1 is smaller than the area of the opening 12b of the first housing 12, and the shape of the second housing 21 is a shape included in the opening 12b of the first housing 12. Therefore, the second housing 21 can be inserted into the opening 12b along the first direction D1. When the second housing 21 is inserted into the opening 12b, the second optical connector 22 is optically connected to the first optical connector 13, and the electrical plug 23 is electrically connected to the electrical connector 14.

The electrical plug 23 protrudes from the second housing 21 in the first direction D1. The electrical plug 23 has a plate shape. The electrical plug 23 has a main surface 23b extending in both the first direction D1 and the second direction D2. The electrical plug 23 has a plurality of pads 23c on the main surface 23b, and the plurality of pads 23c on the main surface 23b are aligned along the second direction D2. The electrical plug 23 can be inserted into the opening 14b of the electrical connector 14. When the electrical plug 23 is inserted into the opening 14b, each pad 23c of the electrical plug 23 is connected to each pad inside the electrical connector 14. Accordingly, the electrical plug 23 is electrically connected to the electrical connector 14.

Figure 4:
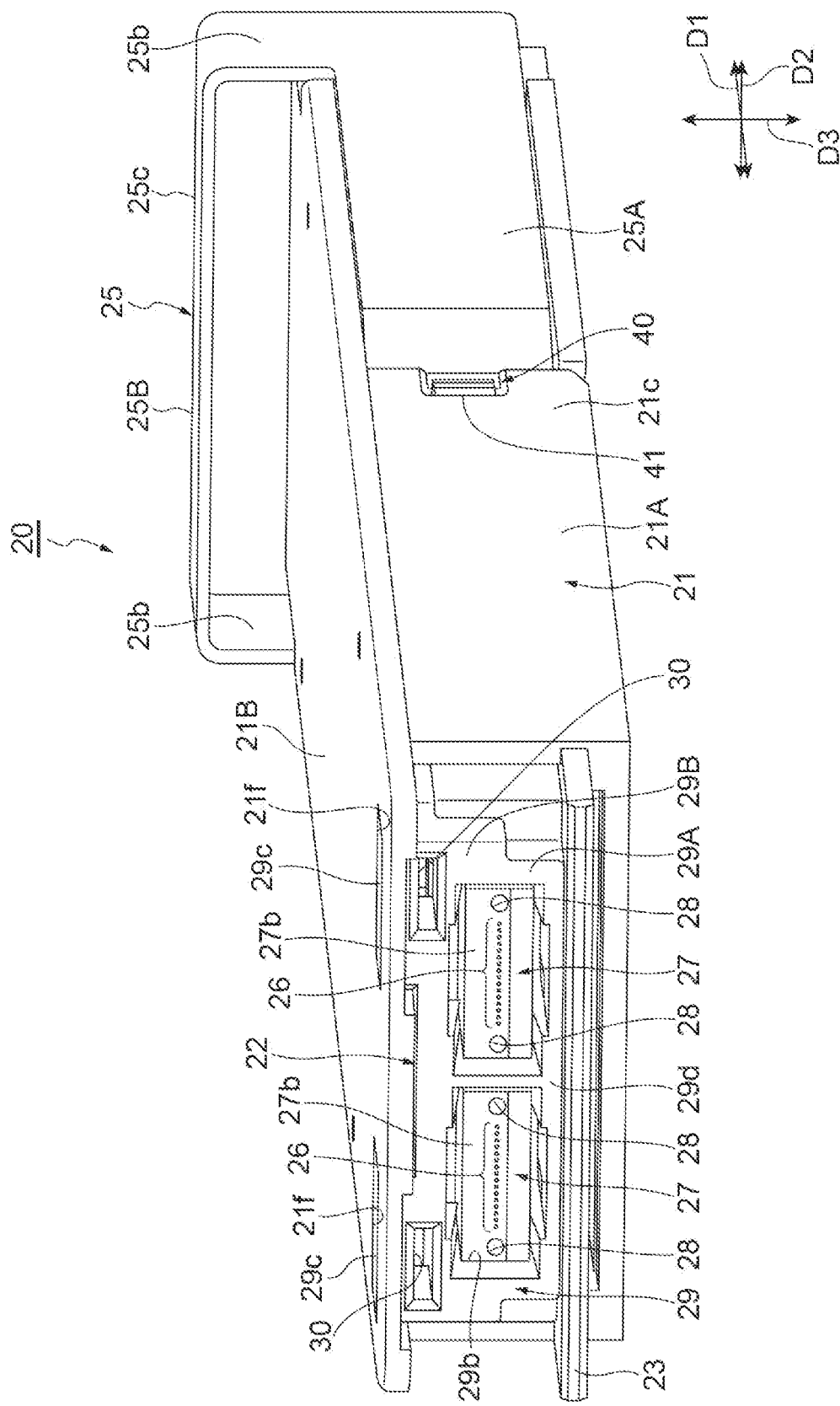
FIG. 4 is a perspective view illustrating the light-emitting device according to the embodiment.

FIG. 4 is a perspective view illustrating the light-emitting device 20. As illustrated in FIGS. 3 and 4, the second optical connector 22 includes second optical fibers 26 and second ferrules 27 holding the second optical fibers 26. The second optical connector 22 has a plurality of the second optical fibers 26, and the plurality of second optical fibers 26 extend from the second ferrules 27 into the second housing 21. Each of the plurality of second optical fibers 26 is connected to the light-emitting element 24.

The light-emitting element 24 is mounted on a circuit board (not illustrated) electrically connected to the electrical plug 23 and receives electric power supply through the electrical plug 23. The light-emitting element 24 emits light by electric power received through the electrical plug 23, and the light from the light-emitting element 24 propagates to the second optical fibers 26. The light-emitting device 20 has, for example, the two light-emitting elements 24, and the two light-emitting elements 24 are aligned along the second direction D2. The light-emitting device 20 has the plurality of second optical fibers 26. The second ferrules 27 hold a plurality of second optical fibers 26 aligned along the second direction D2. As an example, the number of second optical fibers 26 held by the second ferrules 27 is 16, and the second optical connector 22 has a total of 32 second optical fibers 26.

The second ferrules 27 are, for example, MT ferrules. The second ferrule 27 has an end face 27b that is connected to the first ferrule 16 described above. Distal end faces of the plurality of second optical fibers 26 are exposed on the end face 27b. For example, the end face 27b and the distal end face of the second optical fiber 26 are polished so as to be flush with each other. The second ferrule 27 has a ferrule guide hole 28 into which the ferrule guide pin 18 of the first optical connector 13 is inserted. The second ferrule 27 has the pair of ferrule guide holes 28 aligned along the second direction D2. Distal end faces of the plurality of second optical fibers 26 are positioned between the pair of ferrule guide holes 28.

When the second housing 21 is inserted into the first housing 12, each second optical fiber 26 is optically connected to each first optical fiber 15. At this time, the end face 27b of the second ferrule 27 may or may not be in contact with the end face 16b of the first ferrule 16.

That is, the second ferrules 27 may be connected to the first ferrule 16 by PC (Physical Contact), or the second optical fibers 26 may be optically connected to the first optical fiber 15 by spatial connection (non-contact). By inserting the ferrule guide pin 18 into the ferrule guide hole 28, the second ferrule 27 is positioned with respect to the first ferrule 16.

For example, the second optical connector 22 has a block 29 that holds the second ferrules 27. The block 29 has a through-hole 29b penetrating along the first direction D1, and the second ferrule 27 is inserted and held in the through-hole 29b. The block 29 is provided on the upper side of the second housing 21 (on the side opposite to the bottom face 21b) as viewed from the electrical plug 23. The block 29 has a first portion 29A facing the electrical plug 23 and a second portion 29B positioned between the first portion 29A and the upper housing 21B. The first portion 29A and the second portion 29B have, for example, a rectangular shape. The length of the second portion 29B in the second direction D2 is longer than the length of the first portion 29A in the second direction D2. The second portion 29B has convex portions 29c that protrude upward. The second portion 29B has a pair of the convex portions 29c aligned along the second direction D2. Each of the pair of convex portions 29c is exposed to each opening 21f.

The block 29 has a guide hole 30 into which the guide pin 17 is inserted. The host device 10 has the guide pin 17. By providing the light-emitting device 20 with the guide hole 30 into which the guide pin 17 is inserted, a position accuracy of the first optical connector 13 and the second optical connector 22 at the time of connection can be improved. Incidentally, the first optical connector 13 of the host device 10 may have the guide hole 30, and the second optical connector 22 of the light-emitting device 20 may have the guide pin 17. In this case also, the same effect as described above can be obtained.

The block 29 has an end face 29d where the opening of the through-hole 29b and the opening of the guide hole 30 are exposed. The two guide holes 30 are aligned along the second direction D2 in the end face 29d. The pair of guide holes 30 are provided on each of both end sides of the pair of second ferrules 27 in the second direction D2 as viewed along the third direction D3. For example, the guide hole 30 is provided between the convex portion 29c and the through-hole 29b.

Figure 5:
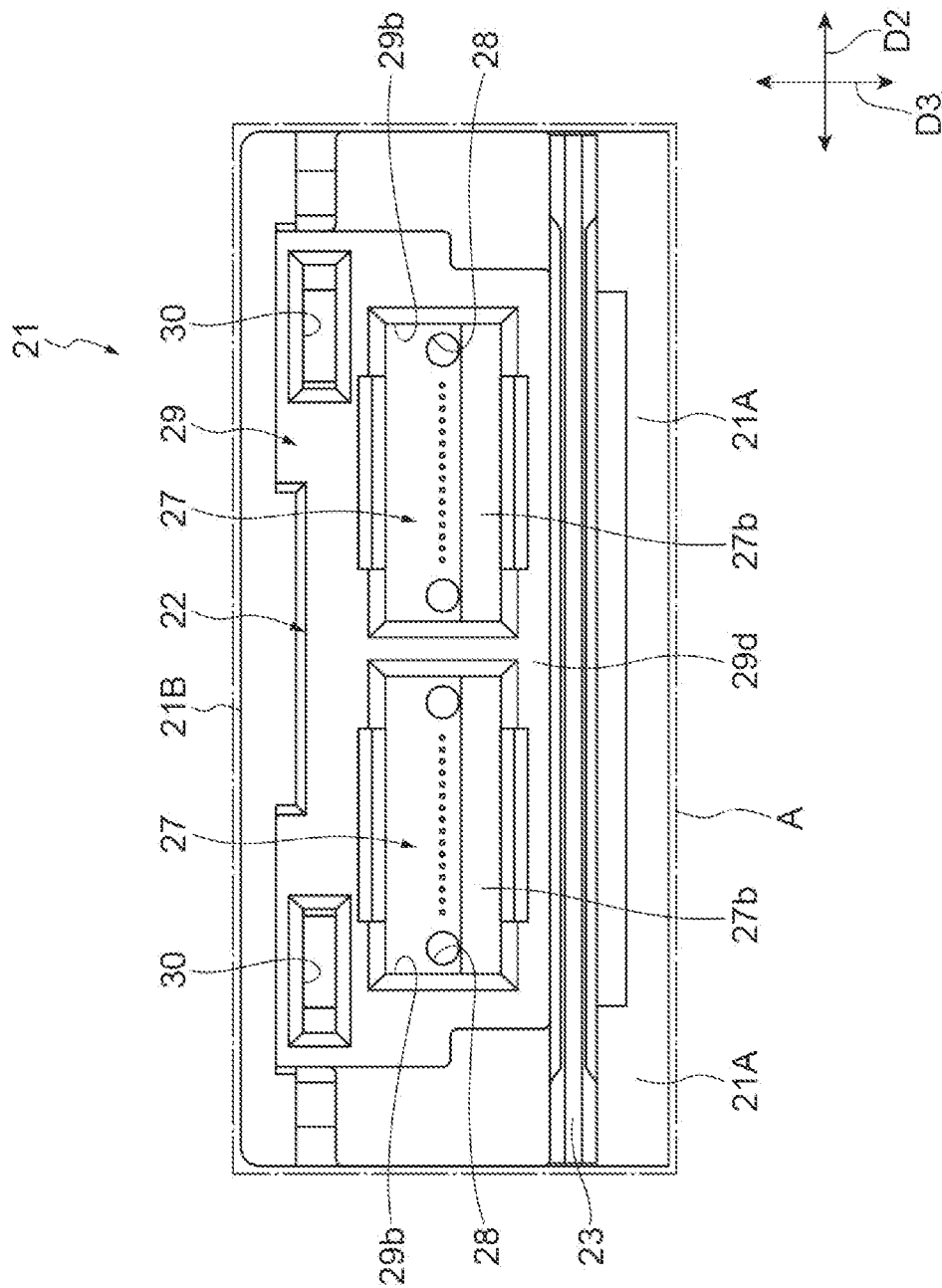
FIG. 5 is a front view of the light-emitting device according to the embodiment.

FIG. 5 is a front view of the second housing 21 and the second optical connector 22 as viewed along the first direction D1. As illustrated in FIG. 5, both the opening of the through-hole 29b and the opening of the guide hole 30 have a rectangular shape with long sides extending along the second direction D2 and short sides extending along the third direction D3. The ratio of the area of the opening of the guide hole 30 to the area of the light-emitting device 20 (for example, the portion A of the second housing 21 excluding the lever 25) viewed along the first direction D1 is, for example, 0.5% or more and 15% or less. The ratio of the area of the opening of the guide hole 30 to the area of the end face 27b of the second ferrule 27 is, for example, 5% or more and 60% or less. That is, the area of the cross section of the opening of the guide hole 30 perpendicular to the direction (first direction D1) in which the optical axis of the second optical fiber 26 extends is 0.5% or more and 15% or less of the area of the cross section of the light-emitting device 20 perpendicular to the direction in which the optical axis of the second optical fiber 26 extends and 5% or more and 60% or less of the area of the end face 27b of the second ferrule 27 where the second optical fiber 26 is exposed. Since the area of the opening of the guide hole 30 is 0.5% or more of the area of the portion A and 5% or more of the area of the end face 27b, the strength of the guide pin 17 can be maintained. Further, since the area of the opening of the guide hole 30 is 15% or less of the area of the portion A and 60% or less of the area of the end face 27b, an increase in the size of the light-emitting device 20 is suppressed.

As illustrated in FIGS. 3 and 4, the lever 25 is a portion operated when removing the light-emitting device 20 from the host device 10. For example, the lever 25 includes slide portions 25A movably attached to the second housing 21 and pinch portions 25B connected to the slide portions 25A. The lever 25 has a pair of slide portions 25A, and each of the slide portions 25A is provided on each side face 21c of the second housing 21. The slide portion 25A extends from the vicinity of the center of the second housing 21 in the first direction D1 to the side opposite to the second optical connector 22. The pinch portion 25B includes a pair of first extension portions 25b and a second extension portion 25c. The pair of first extension portions 25b extends upward from the end portion of the slide portion 25A opposite to the second optical connector 22 and is aligned along the second direction D2. In the second extension portion 25c, the upper ends of the pair of first extension portions 25b are connected to each other.

Figure 6:
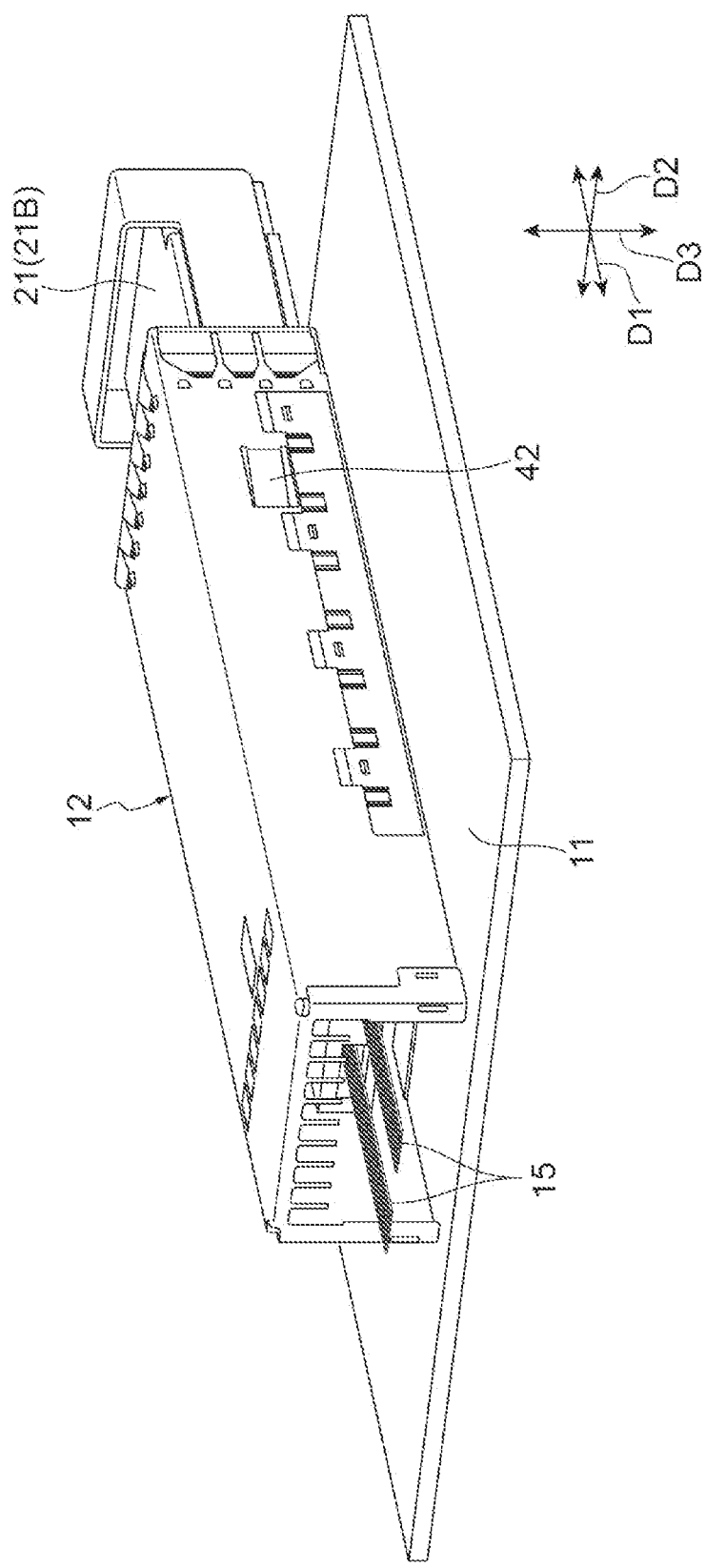
FIG. 6 is a perspective view illustrating a state where a second housing of the light-emitting device is inserted into a first housing of a host device according to the embodiment.

The second housing 21 has a latch structure 40 that is latched onto the first housing 12 when inserted into the first housing 12. FIG. 6 is a view describing the engagement of the latch structure 40 with the first housing 12. As illustrated in FIGS. 4 and 6, the first housing 12 has a tab 42 with which the second housing 21 is engaged, and the latch structure 40 has a protrusion 41 which presses and spreads the tab 42 outward in the second direction D2. For example, a pair of latch structures 40 are provided at the end portions of the pair of slide portions 25A (the end portions opposite to the pinch portions 25B).

Figure 7:
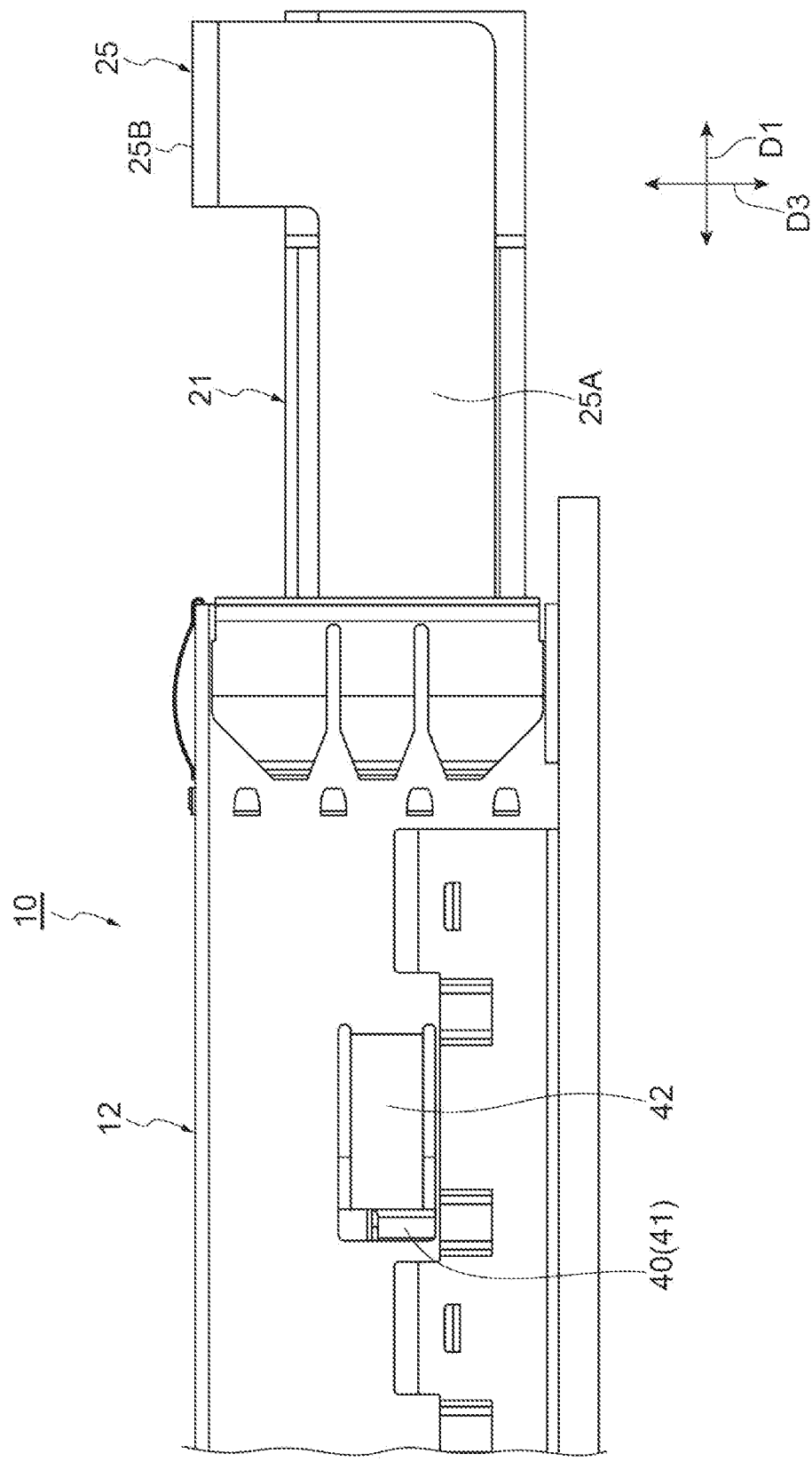
FIG. 7 is a side view illustrating a state where a latch structure of the light-emitting device according to the embodiment is engaged with the first housing of the host device.

FIG. 7 is a side view illustrating the first housing 12 of the host device 10. As illustrated in FIG. 7, when the second housing 21 is inserted into the first housing 12, the protrusions 41 of the latch structure 40 press and spread the tab 42 outward in the second direction D2, so that the protrusions 41 are engaged with the tab 42. When the pinch portion 25B is held by hand and the lever 25 is pulled to the side opposite to the host device 10, the protrusion 41 presses and spreads the tab 42 outward in the second direction D2, and the engagement of the latch structure 40 with respect to the tab 42 is released. Then, the light-emitting device 20 can be pulled out from the host device 10.

In the optical device 1 according to this embodiment, the second housing 21 of the light-emitting device 20 has a latch structure 40 that is latched onto the first housing 12 of the host device 10. Therefore, the first optical connector 13 (block 19) and the second optical connector 22 (block 29) can be configured not to have a latch structure. That is, by providing the second housing 21 with the latch structure 40, the second optical connector 22 accommodated inside the second housing 21 can be configured not to have a latch structure. Since the first optical connector 13 and the second optical connector 22 can be configured not to have a latch structure, an increase in the size of the optical connector can be suppressed, and space saving can be achieved.

The latch structure 40 may also have a mechanism where a latch is released when pulled out. That is, as described above, when pulled out, the protrusions 41 of the latch structure 40 may press and spread the tab 42 outward in the second direction D2 to allow the latch of the latch structure 40 to be released from the tab 42.

Figure 8:
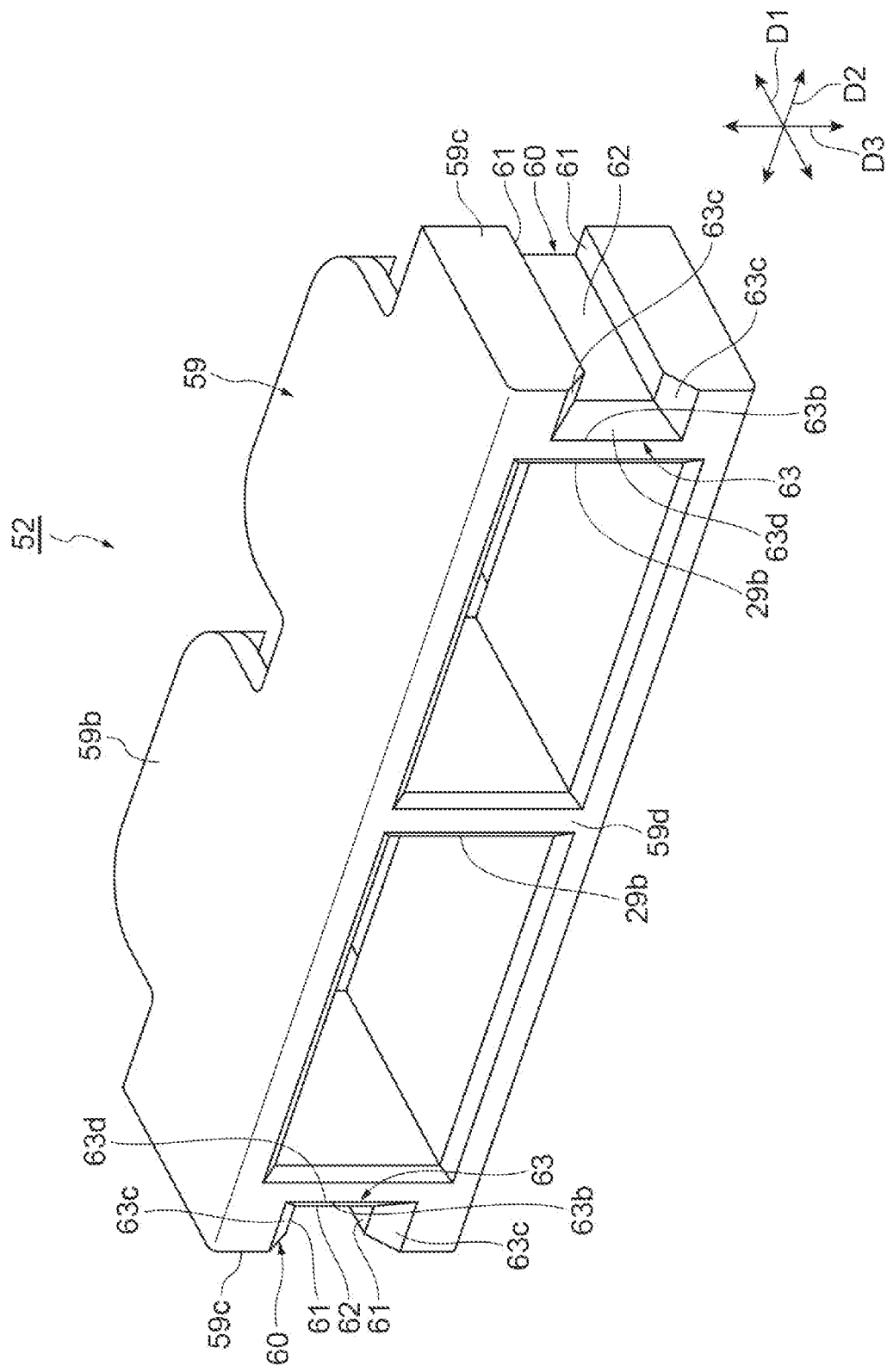
FIG. 8 is a perspective view of a second optical connector according to a modified example.

Next, modified examples of the optical device according to the present disclosure will be described. FIG. 8 is a perspective view illustrating a second optical connector 52 according to a modified example. Since a configuration of a portion of the second optical connector 52 overlaps with a configuration of a portion of the second optical connector 22 described above, the description that overlaps with the second optical connector 22 is denoted by the same reference numerals, and the description thereof will be omitted as appropriate. The second optical connector 52 has an uneven portion 60 into which the first optical connector is inserted instead of the guide hole 30.

FIG. 8 illustrates an example in which the uneven portion 60 is a concave portion recessed from the surface of the second optical connector 52, and the first optical connector has a convex portion inserted into the concave portion along the first direction D1. However, the uneven portion of the second optical connector 52 may be a convex portion protruding from the surface of the second optical connector 52. In this case, the first optical connector has a concave portion inserted along the first direction D1 in the convex portion.

The second optical connector 52 has a block 59 that hold the second ferrules 27, and the block 59 has an uneven portion 60 formed therein. The block 59 has an upper face 59b extending in both the first direction D1 and the second direction D2 and a pair of side faces 59c extending in both the first direction D1 and the third direction D3 and aligned along the second direction D2. The upper face 59b is, for example, a flat face. The block 59 has, for example, a pair of uneven portions 60 aligned along the second direction D2. Each uneven portion 60 is formed on each side face 59c. The uneven portion 60 is defined by, for example, a pair of inner side faces 61 recessed from the side face 59c and aligned along the third direction D3 and a bottom face 62 extending in both the first direction D1 and the third direction D3 between the pair of inner side faces 61.

The block 59 has an end face 59d in which the opening of the through-hole 29b is formed, and a tapered portion 63 is formed between the uneven portion 60 and the end face 59d. The tapered portion 63 has a C-shaped opening 63b on the end face 59d. The tapered portion 63 is a portion that widens from the uneven portion 60 toward the end face 59d. Therefore, the area of the opening 63b as viewed along the first direction D1 is larger than the area of the uneven portion 60 as viewed along the first direction D1.

The tapered portion 63 is defined by a pair of first inclined faces 63c and a pair of second inclined faces 63d. The pair of first inclined faces 63c are inclined from each inner side face 61 toward the end face 59d in both the first direction D1 and the third direction D3. The second inclined face 63d extends from the bottom face 62 toward the end face 59d and is inclined in both the first direction D1 and the second direction D2. Since the second optical connector 52 is provided with the uneven portion 60 in which the tapered portion 63 is formed, the insertion of the first connector into the second optical connector 52 can be performed smoothly. Heretofore, the embodiments and the modified examples have been described above. However, the present invention is not limited to the above-described embodiments or modified examples, and various modification is possible within the scope without changing the spirit disclosed each claim.

REFERENCE SIGNS LIST

1: optical device, 10: host device, 11: host substrate, 11b: hole, 11c: main surface, 12: first housing, 12b: opening, 13: first optical connector, 13b: through-hole, 14: electrical connector, 14b: opening, 15: first optical fiber, 16: first ferrule, 16b: end face, 17: guide pin, 18: ferrule guide pin, 19: block, 19A: first portion, 19B: second portion, 20: light-emitting device, 21: second housing, 21A: lower housing, 21B: upper housing, 21b: bottom face, 21c: side face, 21d: end face, 21f: opening, 22, 52: second optical connector, 23: electrical plug, 23b: main surface, 23c: pad, 24: light-emitting element, 25: lever, 25A: slide portion, 25B: pinch portion, 25b: first extension portion, 25c: second extension portion, 26: second optical fiber, 27: second ferrule, 27b: end face, 28: ferrule guide hole, 29, 59: block, 29A: first portion, 29B: second portion, 29b: through-hole, 29c: convex portion, 29d: end face, 30: guide hole, 40: latch structure, 41: protrusion, 42: tab, 59b: upper face, 59c: side face, 59d: end face, 60: uneven portion, 61: inner side face, 62: bottom face, 63: tapered portion, 63b: opening, 63c: first inclined face, 63d: second inclined face, D1: first direction, D2: second direction, D3: third direction.

The invention claimed is:

1. An optical device comprising:
a host device having a first housing, a first optical connector arranged inside the first housing, and an electrical connector arranged inside the first housing; and
a light-emitting device having a second optical connector optically connected to the first optical connector, an electrical plug into which the electrical connector is inserted for electrical connection there-between, and a second housing accommodating the second optical connector and the electrical plug and inserted into the first housing,
wherein:
the second housing has a latch structure latched onto the first housing when inserted into the first housing,
the second optical connector has a guide hole separate and distinct from the electrical plug,
the first optical connector has a guide pin that is separate and distinct from the electrical connector and is inserted into the guide hole,
the first optical connector has a first optical fiber and a first ferrule holding the first optical fiber,
the second optical connector has a second optical fiber and a second ferrule holding the second optical fiber, and
an area of a cross section of an opening of the guide hole perpendicular to a direction in which an optical axis of the second optical fiber extends is 0.5% or more and 15% or less of an area of a cross section of the light-emitting device perpendicular to the direction in which the optical axis of the second optical fiber extends and 5% or more and 60% or less of an area of an end face of the second ferrule where the second optical fiber is exposed.

2. The optical device according to claim 1, wherein the second optical connector has an uneven portion formed on a surface of the second optical connector and into which the first optical connector is inserted.

3. The optical device according to claim 1, wherein the latch structure further has a mechanism where a latch is released when pulled out.

4. An optical device comprising:
a host device having a first housing, a first optical connector arranged inside the first housing, and an electrical connector arranged inside the first housing; and
a light-emitting device having a second optical connector optically connected to the first optical connector, an electrical plug into which the electrical connector is inserted for electrical connection there-between, and a second housing accommodating the second optical connector and the electrical plug and inserted into the first housing,
wherein:
the second housing has a latch structure latched onto the first housing when inserted into the first housing,
the first optical connector has a guide hole separate and distinct from the electrical plug,
the second optical connector has a guide pin that is separate and distinct from the electrical connector and is inserted into the guide hole,
the first optical connector has a first optical fiber and a first ferrule holding the first optical fiber,
the second optical connector has a second optical fiber and a second ferrule holding the second optical fiber, and
an area of a cross section of an opening of the guide hole perpendicular to a direction in which an optical axis of the first optical fiber extends is 0.5% or more and 15% or less of an area of a cross section of the first housing perpendicular to the direction in which the optical axis of the first optical fiber extends and 5% or more and 60% or less of an area of an end face of the first ferrule where the first optical fiber is exposed.

5. The optical device according to claim 4, wherein the latch structure further has a mechanism where a latch is released when pulled out.

* * * * *